US009957034B2

(12) United States Patent
Yamaura et al.

(10) Patent No.: US 9,957,034 B2
(45) Date of Patent: May 1, 2018

(54) WINDSHIELD OF AIRCRAFT

(71) Applicant: MITSUBISHI AIRCRAFT CORPORATION, Aichi (JP)

(72) Inventors: Taketoshi Yamaura, Tokyo (JP); Katsuya Kitazume, Aichi (JP); Masaki Hashimoto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 226 days.

(21) Appl. No.: 14/977,941

(22) Filed: Dec. 22, 2015

(65) Prior Publication Data

US 2016/0236766 A1 Aug. 18, 2016

(30) Foreign Application Priority Data

Feb. 17, 2015 (JP) .................................. 2015-028544

(51) Int. Cl.
*B64C 1/14* (2006.01)
*B64D 45/02* (2006.01)
*B64D 15/12* (2006.01)
*H05B 3/84* (2006.01)

(52) U.S. Cl.
CPC .............. *B64C 1/1492* (2013.01); *B64C 1/14* (2013.01); *B64C 1/1476* (2013.01); *B64D 15/12* (2013.01); *B64D 45/02* (2013.01); *H05B 3/84* (2013.01); *H05B 2203/002* (2013.01); *H05B 2203/013* (2013.01)

(58) Field of Classification Search
CPC ....... B64C 1/1492; B64C 1/1476; B64C 1/14; B64C 15/12; H05B 3/84; H05B 2203/013; H05B 2203/002; B64D 15/12; B64D 45/02
See application file for complete search history.

(56) References Cited

U.S. PATENT DOCUMENTS

| | | | | |
|---|---|---|---|---|
| 2,518,277 A | * | 8/1950 | Brewer | .................... H05B 3/84 |
| | | | | 219/481 |
| 2008/0318011 A1 | | 12/2008 | Chaussade | |
| 2013/0026296 A1 | | 1/2013 | Yokoi | |
| 2013/0087655 A1 | | 4/2013 | Eddy | |
| 2016/0077027 A1 | * | 3/2016 | Sweers | ................. B29C 65/483 |
| | | | | 324/654 |

FOREIGN PATENT DOCUMENTS

| | | |
|---|---|---|
| GB | 1206194 A | 9/1970 |
| JP | 2011-225076 A | 11/2001 |

OTHER PUBLICATIONS

Extended European Search Result issued in application No. EP 15202054 dated Jun. 21, 2016.

* cited by examiner

*Primary Examiner* — Valentina Xavier
(74) *Attorney, Agent, or Firm* — Pearne & Gordon LLP

(57) ABSTRACT

The present invention provides a windshield of an aircraft, including a plurality of conductive members that are disposed along an in-plane direction of the windshield, and are wire-connected together, wherein the plurality of conductive members are heaters that generate heat when supplied with an alternating current, and the conductive members are wire-connected such that induced currents induced in the respective conductive members by a magnetic field in association with a lightning current are circulated between the conductive members.

8 Claims, 15 Drawing Sheets

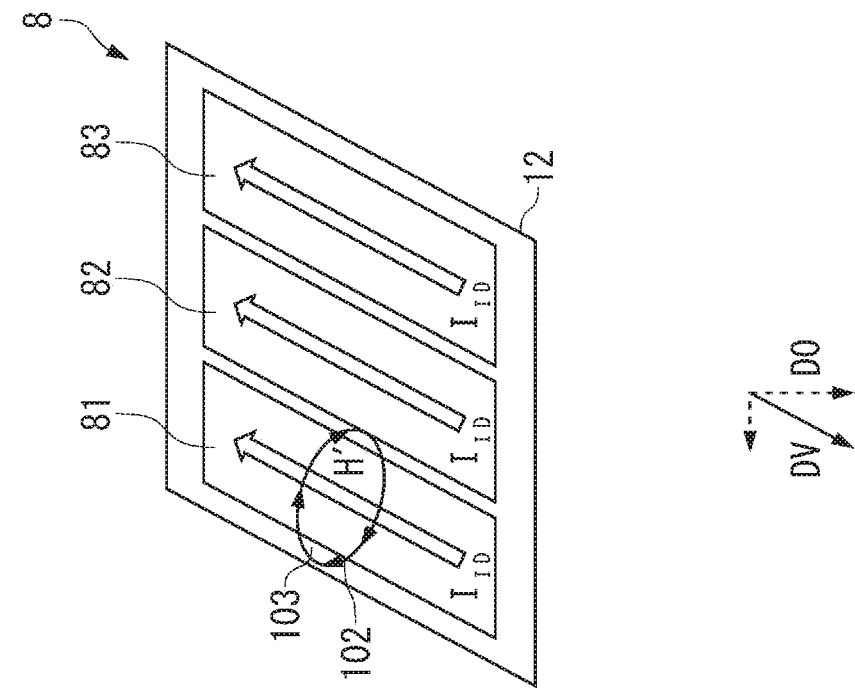
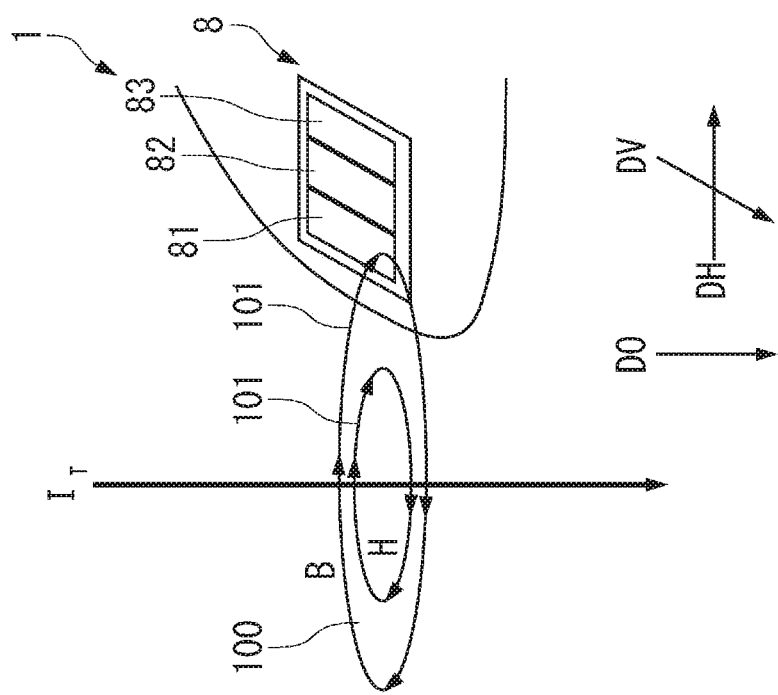

WINDSHIELD OF AIRCRAFT

BACKGROUND OF THE INVENTION

Field of the Invention

The present invention relates to a windshield of an aircraft, and more particularly, to a heater provided in the windshield.

Description of the Related Art

A windshield of an aircraft includes a heater in order to prevent occurrence of fogging due to a temperature difference and adhesion of ice (Japanese Patent Laid-Open No. 2011-225076).

In Japanese Patent Laid-Open No. 2011-225076, a thin film of ITO (indium tin oxide), gold, silver, or the like is formed on a windshield panel as the heater. The fogging of the windshield and the adhesion of ice thereto are prevented by heat generated from the thin film to which a current is supplied.

The windshield of the aircraft, and the heater provided in the windshield need to have reliability against lightning.

Countermeasures against a direct strike of lightning are taken such that a high current of lightning striking a frame or the like of the windshield is spread to the airframe which is a conductor. It is also necessary to take countermeasures against an induced current flowing through the heater of the windshield due to a strong magnetic field in association with the lightning current.

If an induced current that is induced in a conductive film or an electrically-heated wire provided in the windshield as the heater flows into a controller connected to the heater, a voltage of the controller may be increased beyond a withstand voltage.

While an electromagnetic shield is typically used for avoiding generation of an induced current by an external magnetic field, it is difficult to ensure visibility required for the windshield while providing the windshield with shieldability high enough to block the strong magnetic field in association with the lightning current.

An object of the present invention is to provide effective countermeasures against an induced current that is induced in a heater of a windshield in a lightning strike.

SUMMARY OF THE INVENTION

A first invention is a windshield of an aircraft, including a plurality of conductive members that are disposed along an in-plane direction of the windshield, and are wire-connected together.

The plurality of conductive members are heaters that generate heat when supplied with an alternating current.

In the present invention, the conductive members are wire-connected such that induced currents induced in the respective conductive members by a magnetic field in association with a lightning current are circulated between the conductive members.

In accordance with the present invention, the induced currents induced by the magnetic field in association with the lightning current are consumed as heat while being circulated between the conductive members. It is thus possible to suppress flowing of an excess current outside the wire connection.

In the first invention, the number of the conductive members may be three, which may be delta-connected and supplied with a three-phase alternating current, all of the three conductive members may extend in a direction crossing a horizontal direction in the in-plane direction of the windshield, and a path in which the induced currents are circulated among the conductive members may be formed by wire-connecting an upper end portion of one of the adjacent conductive members in the delta connection formed by the three conductive members, and a lower end portion of the other of the adjacent conductive members.

When the conductive members extend in the direction crossing the horizontal direction in the in-plane direction of the windshield, the direction in which the conductive members extend includes a component in a vertical direction. The conductive members allow a current to flow in the extending direction.

Therefore, the induced current flows through each of the plurality of conductive members along the extending direction by the magnetic field generated around the lightning current flowing from an upper side to a lower side in most cases. Since the induced current flows in a direction in which a change in a magnetic flux of the magnetic field is hindered, an induced current flowing from the lower side to the upper side is induced in all of the conductive members when the magnetic flux is increased, and an induced current flowing from the upper side to the lower side is induced in all of the conductive members when the magnetic flux is decreased.

Accordingly, the induced currents can be circulated among the conductive members by wire-connecting the upper end and the lower end of the adjacent conductive members in the delta connection out of the plurality of conductive members.

Also, in the first invention, the number of the conductive members may be two, which may be supplied with a single-phase alternating current or a direct current, all of the two conductive members may extend in a direction crossing a horizontal direction in the in-plane direction of the windshield, and a path in which the induced currents are circulated between the conductive members may be formed by wire-connecting an upper end portion of one of the conductive members, and a lower end portion of the other of the conductive members.

Even in this case, since the conductive members extend in the direction crossing the horizontal direction in the in-plane direction of the windshield, and the upper end and the lower end of the adjacent conductive members in the wire connection out of the plurality of conductive members are wire-connected, the induced currents can be circulated between the conductive members.

A second invention is a windshield of an aircraft, including a plurality of conductive members that are disposed along an in-plane direction of the windshield, and are wire-connected together.

The plurality of conductive members are heaters that generate heat when supplied with an alternating current.

In the present invention, the conductive members are wire-connected such that induced currents induced in the respective conductive members by a magnetic field in association with a lightning current are canceled out.

In accordance with the present invention, the induced currents induced by the magnetic field in association with the lightning current are canceled out. It is thus possible to suppress flowing of an excess current outside the wire connection.

In the second invention, the number of the conductive members may be three, which may be star-connected and supplied with a three-phase alternating current, all of the three conductive members may extend in a direction crossing a horizontal direction in the in-plane direction of the windshield, and the induced currents may be canceled out by wire-connecting upper end portions of the respective conductive members at a neutral point.

The direction in which the conductive members extend includes a component in a vertical direction. The conductive members allow a current to flow in the extending direction. Therefore, when a magnetic flux is increased, the induced currents are induced in all of the conductive members from a lower side to an upper side by the magnetic field generated around the lightning current flowing from the upper side to the lower side in most cases.

Accordingly, the induced currents can be canceled out by wire-connecting the upper end portions of the respective three conductive members at the neutral point of the star connection.

Also, in the second invention, the number of the conductive members may be two, which may be supplied with a single-phase alternating current or a direct current, all of the two conductive members may extend in a direction crossing a horizontal direction in the in-plane direction of the windshield, and the induced currents may be canceled out by wire-connecting upper end portions of the respective conductive members.

Even in this case, since the conductive members extend in the direction crossing the horizontal direction in the in-plane direction of the windshield, and the upper ends of the respective two conductive members are wire-connected, the induced currents can be canceled out.

In the first invention and the second invention, the plurality of conductive members may be disposed at different positions from each other in a thickness direction of the windshield.

The conductive member in the present invention may be configured as a planar member along the in-plane direction of the windshield, or a line-like member wired in the in-plane direction of the windshield.

When the conductive member is configured as a planar member, a peripheral edge portion of the windshield may be supported on an airframe via a supporting member having conductivity, and a conductive layer positioned relatively close to the supporting member in a lateral direction included in the in-plane direction of the windshield out of the plurality of conductive layers may be given a smaller width than that of the other conductive layers.

The width of the conductive layers means a dimension of the conductive layers in a direction perpendicular to the extending direction of the conductive layers.

Another windshield according to the present invention includes three conductive members that are disposed along an in-plane direction of the windshield, and are wire-connected together, the three conductive members are heaters that generate heat when supplied with an alternating current, and are disposed in respective three regions obtained by dividing a plane region of the windshield by an inverted Y-shaped gap, an induced current is induced on each of one end side and the other end side in a lateral width direction of the windshield by a magnetic field in association with a lightning current, and the induced current that is induced from a first conductive member positioned at a lower end out of the three conductive members toward a second conductive member positioned on the one end side of the windshield with respect to the first conductive member, and the induced current that is induced from the first conductive member toward a third conductive member positioned on the other end side of the windshield with respect to the first conductive member are canceled out by wire-connecting the second conductive member and the third conductive member.

An aircraft of the present invention includes any one of the above windshields.

In accordance with the present invention, even when the induced currents flow through the conductive members of the windshield by the strong magnetic field in association with the lightning current, it is possible to suppress flowing of an excess current outside the wire connection.

Therefore, it is possible to ensure reliability by avoiding damage to the controller or the like connected to the conductive members.

The present invention can avoid damage to the controller or the like by circulating or canceling out the induced currents. Since it is not necessary to cover the conductive members by an electromagnetic shield, it is also possible to ensure sufficient visibility required for the windshield.

BRIEF DESCRIPTION OF THE DRAWINGS

FIGS. 6A and 6B are schematic views for explaining that induced currents flow through conductive layers in a lightning strike;

DETAILED DESCRIPTION OF THE PREFERRED EMBODIMENTS

In the following, embodiments of the present invention will be described by reference to the accompanying drawings.

First Embodiment

Figure 1:
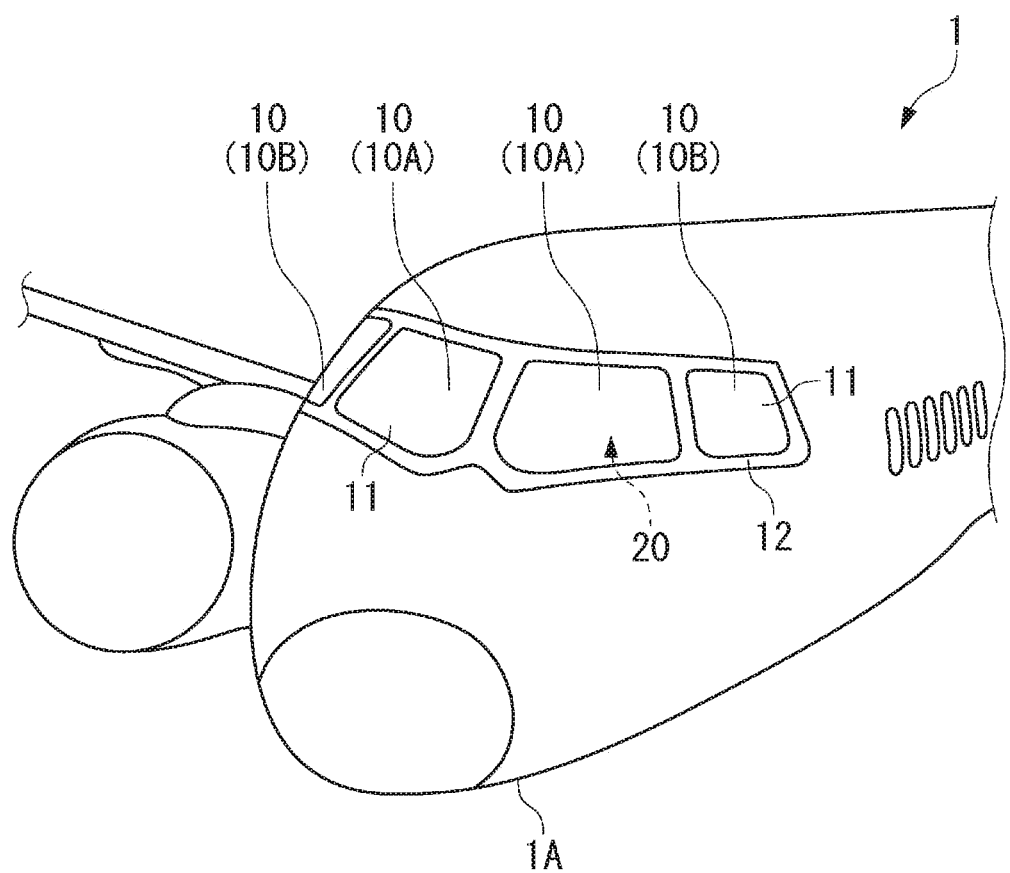
FIG. 1 is a view illustrating an appearance of a windshield of an aircraft according to a first embodiment of the present invention.

An aircraft 1 shown in FIG. 1 includes a windshield 10 and an anti-icing/anti-fogging device 20 that prevents fogging of the windshield 10 and adhesion of ice thereto at a front end of a nose 1A.

The windshield 10 includes main windshields 10A and 10A that ensure a front field of view from the inside of a cockpit, and side windshields 10B and 10B that ensure a side field of view from the inside of the cockpit. The windshields 10A, 10A, 10B, and 10B are symmetrically disposed.

In the following, the windshields 10A, 10A, 10B, and 10B are collectively referred to as the windshield 10.

The windshield 10 is a laminate including a plurality of transparent windshield panels 11 formed of glass, acrylic resin, or the like.

Figure 2:
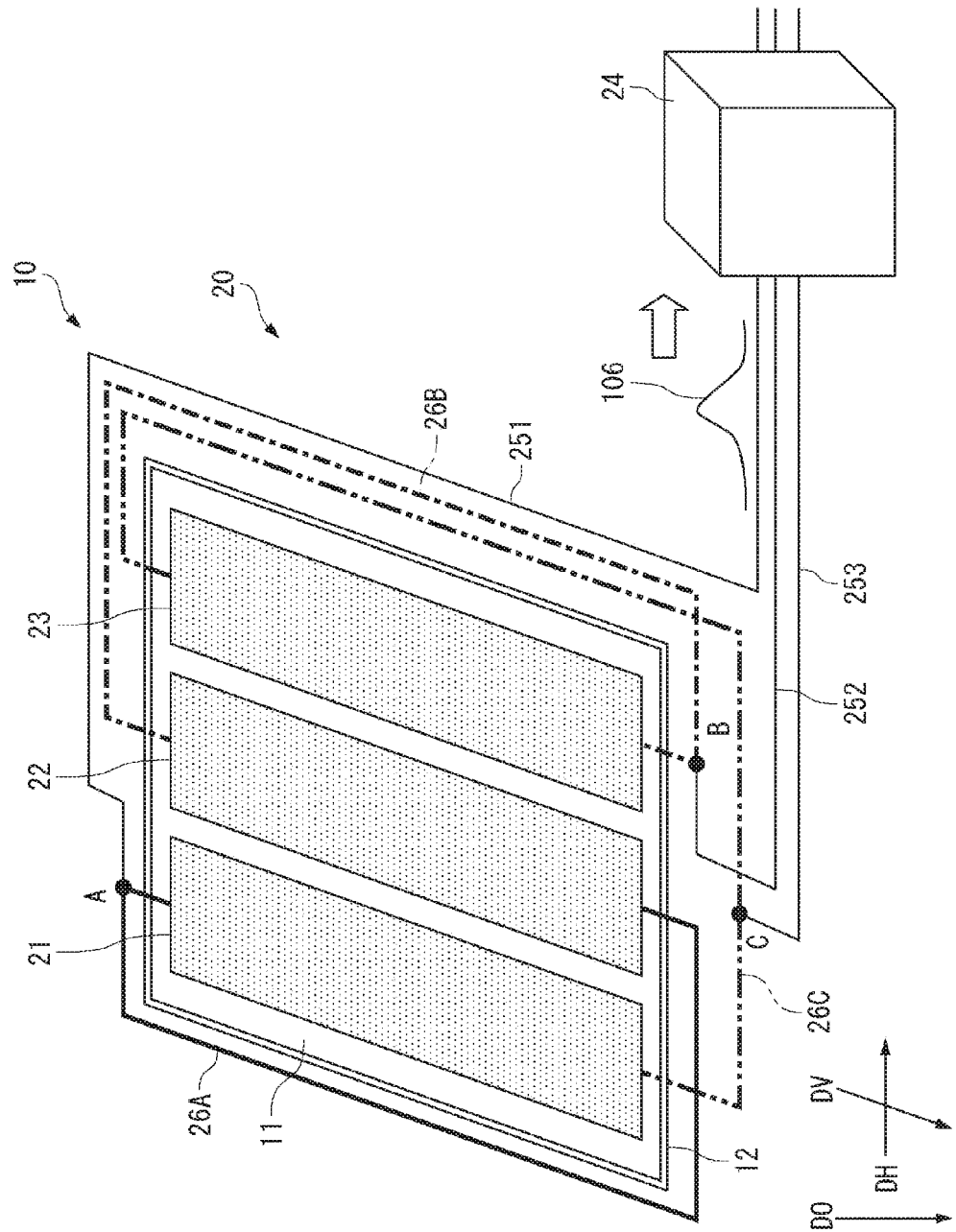
FIG. 2 is a schematic view illustrating the windshield and an anti-icing/anti-fogging device shown in FIG. 1.

The laminate includes a layer that absorbs a shock, and a heater that constitutes the anti-icing/anti-fogging device 20 (conductive layers 21, 22, and 23 in FIG. 2).

The windshield 10 is curved along a shape of an airframe in which the windshield 10 is installed.

The windshield 10 is supported on the airframe by a retainer 12 with a surface on an aircraft outer side directed obliquely upward.

The retainer 12 is disposed along an outer peripheral portion of the windshield panel 11 and an inner peripheral portion of an opening of the airframe.

The retainer 12 is formed of a metal material such as aluminum alloy, and is grounded to the airframe directly or via a fastener or the like.

The anti-icing/anti-fogging device 20 prevents or suppresses fogging of the windshield 10 due to a temperature difference between outside air and air within the cockpit, and adhesion of frost and ice to the outer surface of the windshield 10 in contact with outside air.

The anti-icing/anti-fogging device 20 includes the conductive layers 21, 22, and 23, and a controller 24 that applies a current to the conductive layers 21, 22, and 23 as shown in FIG. 2.

FIG. 2 shows the windshield 10 by simplifying its shape.

The three belt-like conductive layers 21, 22, and 23 are disposed along a curved in-plane direction of the windshield 10. The conductive layers 21, 22, and 23 are independent of each other.

The conductive layers 21, 22, and 23 correspond to a three-phase alternating current applied by the controller 24. The conductive layers 21, 22, and 23 function as the heater by generating heat when a current is supplied.

The conductive layers 21, 22, and 23 are provided in each of the windshields 10A, 10A, 10B, and 10B.

The conductive layers 21, 22, and 23 of the present embodiment are delta-connected.

Figure 3:
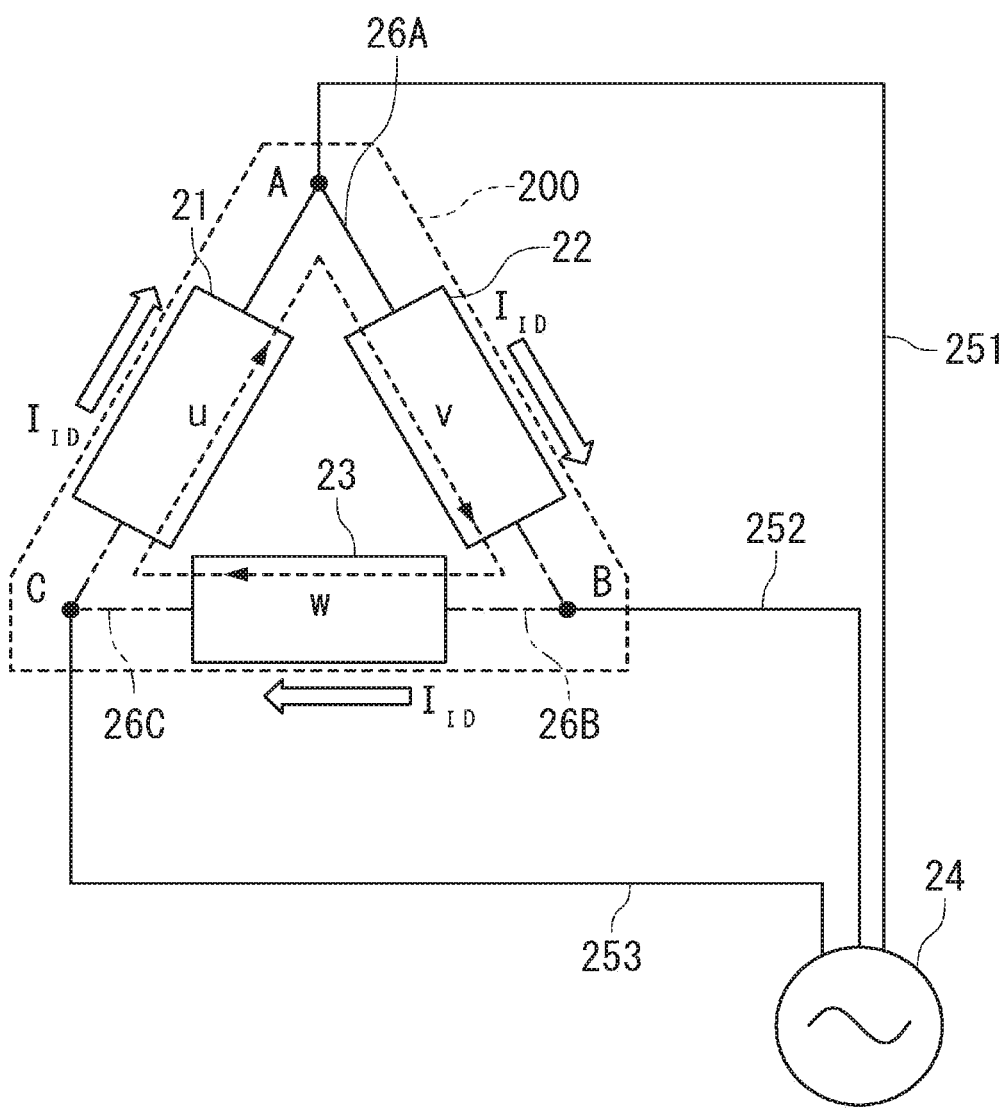
FIG. 3 is a wire connection diagram corresponding to FIG. 2.

In FIG. 2, and FIG. 3 that is a wire connection diagram of the conductive layers 21, 22, and 23, a section between the conductive layers 21 and 22 in a looped path formed by the delta connection is indicated by a solid line. A section between the conductive layers 22 and 23 is indicated by an alternate long and short dash line. A section between the conductive layers 23 and 21 is indicated by an alternate long and two short dashes line. The conductive layers 21, 22, and 23 are connected to the controller 24.

The conductive layers 21, 22, and 23 are transparent thin films of ITO (indium tin oxide), gold, silver, or the like. The conductive layers 21, 22, and 23 can be vapor-deposited on the windshield panel 11. Alternatively, a base film where the conductive layers 21, 22, and 23 are formed may be interposed between the windshield panels 11.

The conductive layers 21, 22, and 23 can be provided at an appropriate position in a thickness direction of the windshield 10. For example, when the windshield 10 includes an outer panel disposed on the aircraft outer side and an inner panel disposed on an aircraft inner side as the windshield panels 11, the conductive layers 21, 22, and 23 can be provided on a surface on the aircraft inner side of the outer panel, a surface on the aircraft outer side of the inner panel, or the like.

Each of the conductive layers 21, 22, and 23 is designed as a circuit that allows a current to flow along a longitudinal direction DV (FIG. 2). The conductive layers 21, 22, and 23 are arranged at a predetermined interval in a lateral direction DH.

The lateral direction DH is a horizontal direction included in the in-plane direction of the windshield 10.

The longitudinal direction DV is perpendicular to the lateral direction DH in the in-plane direction of the windshield 10.

The conductive layers 21, 22, and 23 are disposed in respective three regions obtained by equally dividing a plane region of the windshield 10.

All of the conductive layers 21, 22, and 23 extend along the longitudinal direction DV.

That the direction in which the conductive layers 21, 22, and 23 extend is the longitudinal direction DV is defined based on an attitude of the aircraft 1 that is parked or cruising.

The conductive layers 21, 22, and 23 are electrically insulated from the retainer 12 disposed along the outer peripheral portion of the windshield panel 11, and the airframe.

The conductive layers 21, 22, and 23 of the present embodiment are not limited to a rectangular shape shown in FIG. 2, and may be set to an appropriate form such that respective induced currents become equal in consideration of the shape of the windshield 10.

The wire-connected conductive layers 21, 22, and 23 are connected to the controller 24 by electric wires 251, 252, and 253 as shown in FIG. 2. The electric wire 251 is connected to an A point in a section 26A between the conductive layers 21 and 22. The electric wire 252 is connected to a B point in a section 26B between the conductive layers 22 and 23. The electric wire 253 is connected to a C point in a section 26C between the conductive layers 23 and 21.

The electric wires 251, 252, and 253 are wired in a region less affected by a magnetic field in association with lightning, such as the inside of the retainer 12 and the inside of the airframe.

In the following, a range surrounded by a line denoted by reference numeral 200 so as to include the conductive layers 21, 22, and 23, the sections 26A, 26B, and 26C, and the A point, the B point, and the C point in FIG. 3 is set as a range of the delta connection formed by the conductive layers 21, 22, and 23. Respective sections of the electric wires 251, 252, and 253 positioned outside the A point, the B point, and the C point, and the controller 24 fall under the outside of the wire connection.

The controller 24 applies a drive current to the conductive layers 21, 22, and 23 by electric power received from a power supply line that is mounted on the aircraft 1.

The controller 24 can control heat generation amounts of the conductive layers 21, 22, and 23 by changing a frequency or a voltage of the applied drive current.

The windshield 10 and the anti-icing/anti-fogging device 20 need to have reliability against lightning.

A current of lightning striking a metal member such as the retainer 12 (FIG. 6B) provided in the windshield 10 and a wiper (not shown) is spread to the airframe to which the metal member such as the retainer 12 is grounded. Therefore, it is possible to avoid damage to the windshield 10 by a shock or heat generated by the high current of lightning.

It is also necessary to avoid that induced currents that are induced in the conductive layers 21, 22, and 23 by a strong magnetic field generated around the lightning current flow into the controller 24 through the electric wires 251, 252, and 253.

Here, a higher current can flow through the conductive layers 21, 22, and 23 than through the controller 24. Therefore, in the present embodiment, wiring is performed such that the induced currents induced by the magnetic field in association with the lightning current are circulated among the conductive layers 21, 22, and 23. Thus, outflowing of a high current to the outside of the delta connection including the conductive layers 21, 22, and 23 is suppressed. The induced currents are finally consumed as heat. This point will be described below.

First, a typical wiring form (FIG. 4) of the conductive layers 21, 22, and 23 will be described as a comparative example to the present embodiment.

Figure 4:
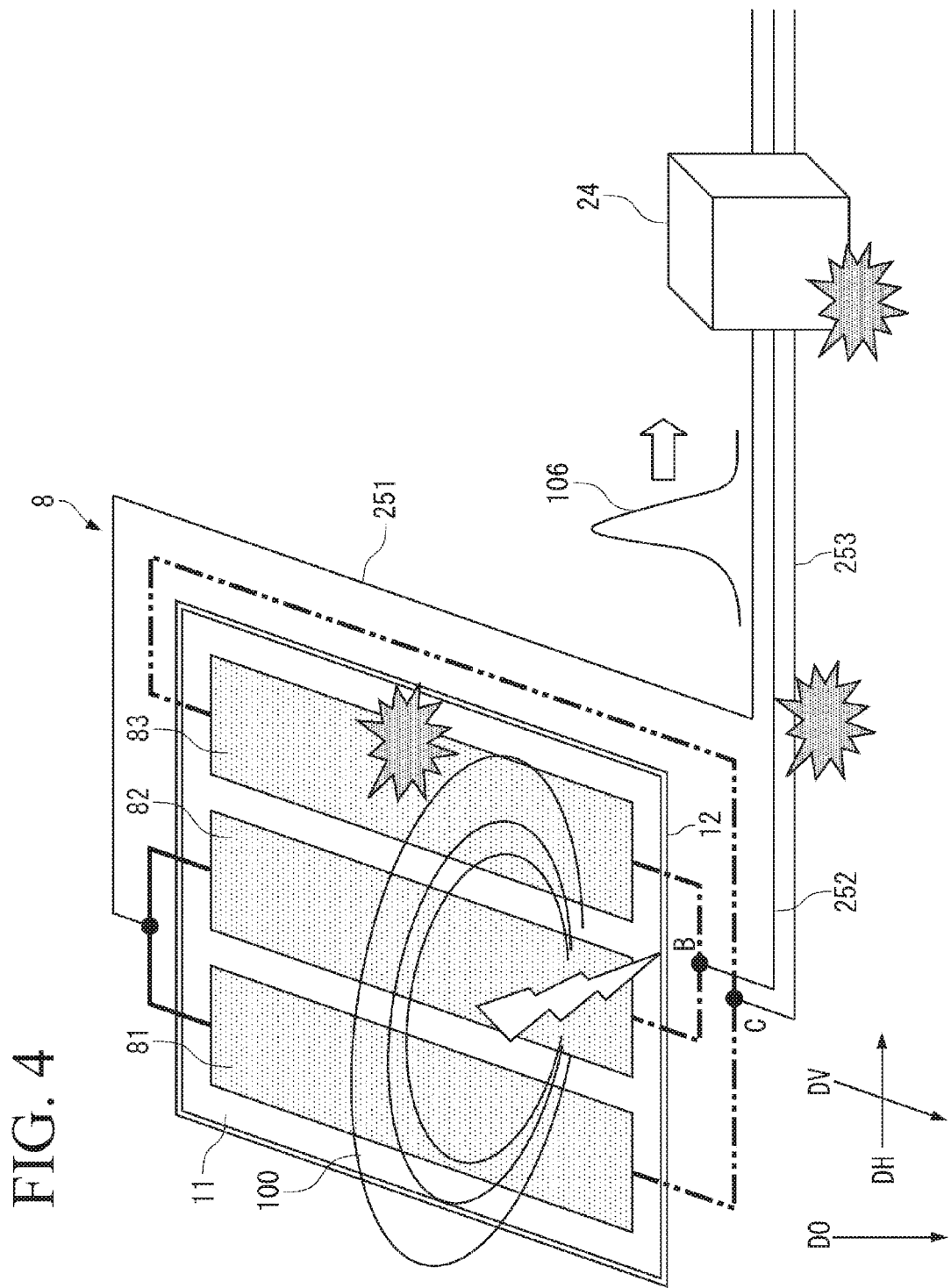
FIG. 4 is a schematic view illustrating a windshield and an anti-icing/anti-fogging device according to a comparative example.

Conductive layers 81, 82, and 83 provided in a windshield 8 shown in FIG. 4 extend along the longitudinal direction DV, are arranged in the lateral direction DH, and are delta-connected similarly to the conductive layers 21, 22, and 23 of the present embodiment. However, a wiring form of the delta connection differs from that of the present embodiment (FIG. 2).

Figure 5:
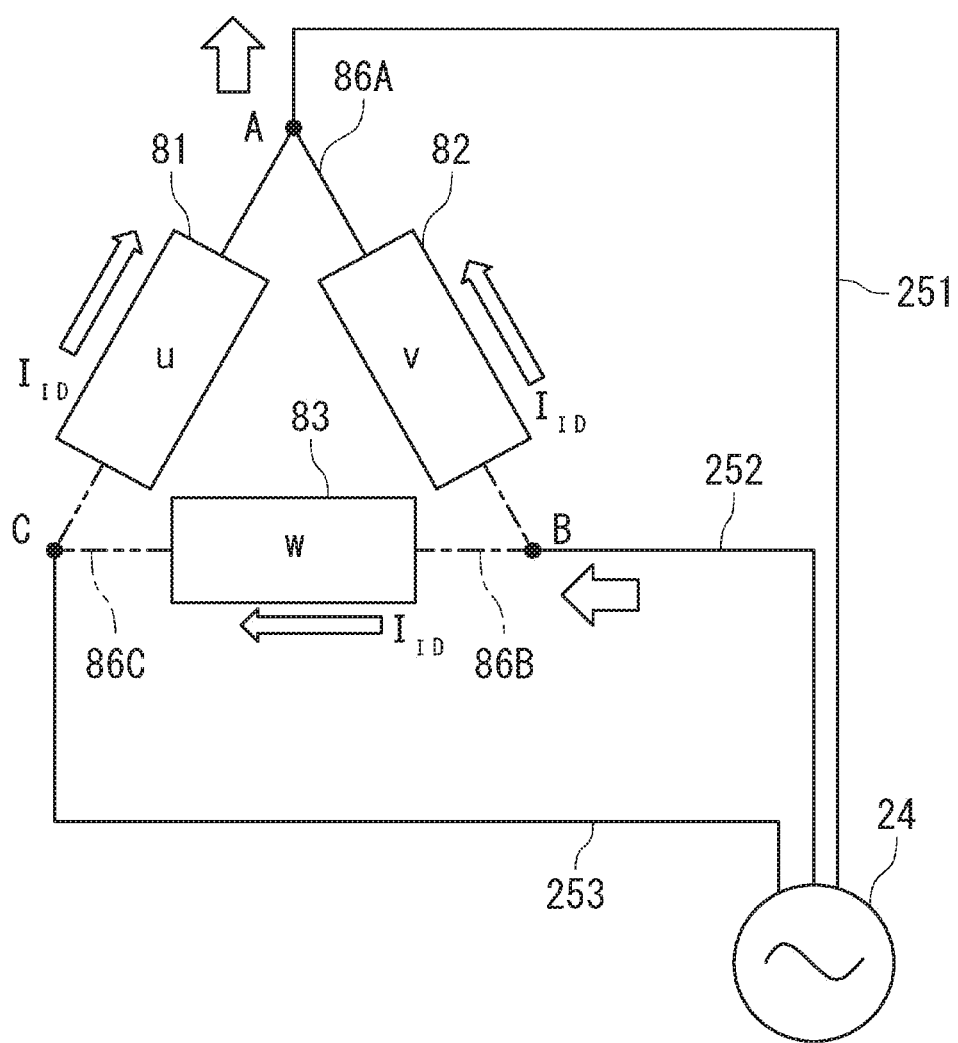
FIG. 5 is a wire connection diagram corresponding to FIG. 4.

In FIG. 4, and FIG. 5 that is a wire connection diagram of the conductive layers 81, 82, and 83, a section between the conductive layers 81 and 82 in a looped path formed by the delta connection is indicated by a solid line. A section between the conductive layers 82 and 83 is indicated by an alternate long and short dash line. A section between the conductive layers 83 and 81 is indicated by an alternate long and two short dashes line.

A section 86A between the conductive layers 81 and 82 links upper ends of the conductive layers 81 and 82 together.

A section 86B between the conductive layers 82 and 83 links lower ends of the conductive layers 82 and 83 together.

A section 86C between the conductive layers 83 and 81 links an upper end of the conductive layer 83 and a lower end of the conductive layer 81.

Induced currents flowing through the conductive layers 81, 82, and 83 of the windshield 8 by a magnetic field in association with a lightning current will be described by reference to FIGS. 6A, 6B.

The aircraft 1 is likely to be struck by lightning generated between the aircraft 1 and a thundercloud existing above the aircraft 1. Thus, lightning is modeled by a lightning current $I_T$ flowing from an upper side to a lower side in a vertical direction D0 (FIG. 6A).

A magnetic field H having a magnetic flux density B is generated around the lightning current $I_T$ according to Ampere's law (right-hand corkscrew rule). A magnetic flux 101 of the magnetic field H is formed concentrically around the lightning current $I_T$. A wavefront 100 formed by the magnetic flux 101 is perpendicular to the lightning current $I_T$.

When the magnetic field H is generated by a lightning strike to the retainer 12 (FIG. 2) or the like of the windshield 10, an induced electromotive force proportional to a change in the magnetic flux 101 is generated in a conductor (the conductive layers 81, 82, and 83) through which the magnetic flux 101 of the magnetic field H passes, and an induced current $I_{ID}$ flows (Faraday's law of induction). The induced current $I_{ID}$ flows in a direction in which the change in the magnetic flux 101 is hindered (Lenz's law).

The longitudinal direction DV in which the conductive layers 81, 82, and 83 extend includes a component in the vertical direction D0. Thus, a magnetic flux 102 formed on a wavefront 103 perpendicular to the induced current $I_{ID}$ includes the direction in which the change in the magnetic flux 101 is hindered. Therefore, the induced current $I_{ID}$ flows in the direction in which the change in the magnetic flux 101 is hindered.

For example, when the magnetic flux 101 is increased by the lightning strike, the induced currents $I_{ID}$ flow through the conductive layers 81, 82, and 83 in a direction indicated by outlined arrows in FIG. 6B from the lower side to the upper side so as to generate the magnetic flux 102 in a direction in which the magnetic flux 101 is canceled. At this time, the magnetic flux 102 of a magnetic field H' generated around the induced current $I_{ID}$ is formed around the induced current $I_{ID}$ on the wavefront 103 perpendicular to the induced current $I_{ID}$.

When the magnetic field H is decreased by spreading the lightning current $I_T$ to the airframe, the induced currents $I_{ID}$ flow through the conductive layers 81, 82, and 83 from the upper side to the lower side so as to generate the magnetic flux 102 in the same direction as the magnetic flux 101.

The induced currents $I_{ID}$ flowing through the conductive layers 81, 82, and 83 are also indicated by outlined arrows in FIG. 5.

As shown in FIG. 5, the induced current $I_{ID}$ induced in the conductive layer 81 flows toward the A point between the conductive layers 81 and 82. The induced current $I_{ID}$ induced in the conductive layer 82 similarly flows toward the A point. The induced current $I_{ID}$ induced in the conductive layer 83 flows toward the C point between the conductive layers 83 and 81.

Accordingly, the induced currents flowing into the A point from both of the conductive layers 81 and 82 flow out to the controller 24-side from the A point through the electric wire 251 based on a rule that a sum of currents flowing into any node in an electric circuit becomes zero (that is, an inflowing current and an outflowing current are equal to each other at any node). Similarly, a current flows into the B point through the electric wire 252 from the controller 24-side corresponding to the induced current $I_{ID}$ flowing through the conductive layer 82 and the induced current $I_{ID}$ flowing through the conductive layer 83. At the C point, when the induced current $I_{ID}$ flowing through the conductive layer 83 and the induced current $I_{ID}$ flowing through the conductive layer 81 are balanced, no current flows into and out of the controller 24.

Next, the conductive layers 21, 22, and 23 of the present embodiment will be described.

In the present embodiment, an upper end of one of the adjacent layers (the conductive layers 21 and 22, the conductive layers 22 and 23, and the conductive layers 23 and 21) in the delta connection (the range 200 in FIG. 3) formed by the conductive layers 21, 22, and 23, and a lower end of the other of the adjacent layers are wire-connected.

As shown in FIG. 2, the section 26A between the conductive layers 21 and 22 links an upper end of the conductive layer 21 and a lower end of the conductive layer 22.

The section 26B between the conductive layers 22 and 23 links an upper end of the conductive layer 22 and a lower end of the conductive layer 23.

The section 26C between the conductive layers 23 and 21 links an upper end of the conductive layer 23 and a lower end of the conductive layer 21.

Figure 7:
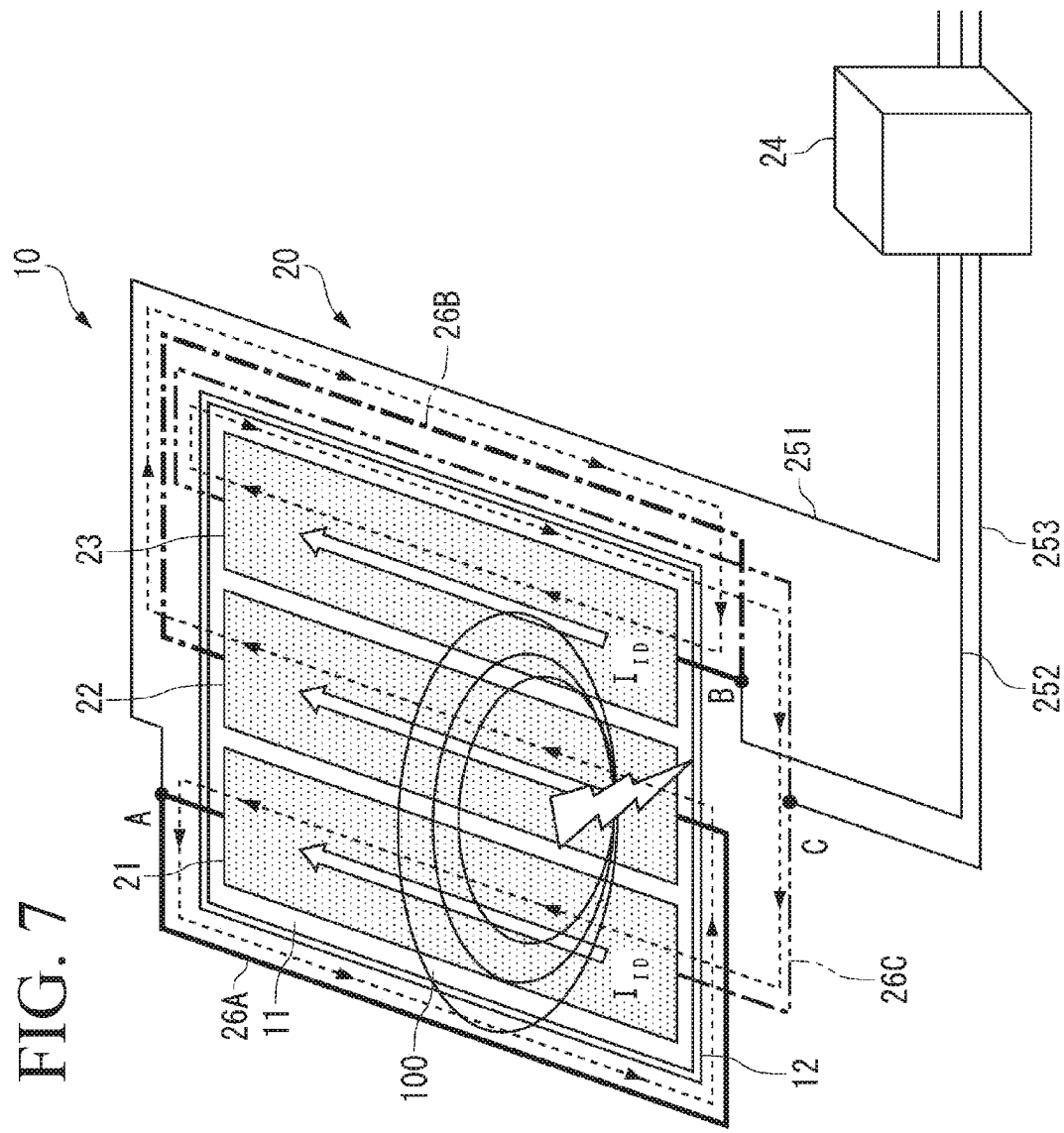
FIG. 7 is a schematic view for explaining that induced currents are circulated among three conductive layers.

Since the conductive layers 21, 22, and 23 of the present embodiment are oriented along the longitudinal direction DV similarly to the above conductive layers 81, 82, and 83, the induced currents $I_{ID}$ flow in a direction indicated by outlined arrows in FIG. 7 similarly to the conductive layers 81, 82, and 83 when the conductive layers 21, 22, and 23 are placed in the magnetic field H generated by the lightning strike to the retainer 12 or the like of the windshield 10.

The induced currents $I_{ID}$ flowing through the conductive layers 21, 22, and 23 are also indicated by outlined arrows in FIG. 3.

As shown in FIG. 3, the induced current $I_{ID}$ induced in the conductive layer 21 flows toward the A point from the C point. The induced current $I_{ID}$ induced in the conductive layer 22 flows toward the B point from the A point. The induced current $I_{ID}$ induced in the conductive layer 23 flows toward the C point from the B point.

That is, the induced current $I_{ID}$ flows into and out of each of the A point, the B point, and the C point.

In the example of the above conductive layers 81, 82, and 83 (FIG. 5), a current corresponding to a sum of the induced currents $I_{ID}$ flowing through the two conductive layers 81 and 82 at the A point flows out to the section of the electric wire 251 outside the A point. A current corresponding to a sum of the induced currents $I_{ID}$ flowing through the two conductive layers 82 and 83 at the B point flows in from the section of the electric wire 252 outside the B point.

In contrast, in the present embodiment, when the inflowing induced current $I_{ID}$ and the outflowing induced current $I_{ID}$ are balanced at the A, B, and C points, no current flows outside the A, B, and C points. At a node (the A, B, and C points) where the inflowing induced current $I_{ID}$ and the outflowing induced current $I_{ID}$ have a difference, only a current corresponding to the current difference flows into and out of the node. An excess current does not flow outside the A, B, and C points.

Therefore, in a state in which the flowing of the current to and from the outside of the path of the delta connection including the conductive layers 21, 22, and 23 is suppressed, the induced currents $I_{ID}$ are circulated among the conductive layers 21, 22, and 23 from the conductive layer 21 to the conductive layer 22 through the A point, to the conductive layer 23 through the B point, and to the conductive layer 21 through the C point as indicated by dashed arrows in FIGS. 3 and 7. The induced currents $I_{ID}$ are converted into heat and attenuated while flowing through the looped path formed by wire-connecting the conductive layers 21, 22, and 23.

When the magnetic field H is decreased, the induced currents $I_{ID}$ flow in a direction opposite to the direction indicated by the outlined arrows in FIGS. 3 and 7. The induced currents $I_{ID}$ are circulated through a looped path in a direction opposite to the direction indicated by the dashed arrows, and are consumed as heat.

In accordance with the present embodiment, even when the induced currents $I_{ID}$ are induced in the conductive layers 21, 22, and 23 by the strong magnetic field H in association with the lightning current $I_T$, energy of the induced currents $I_{ID}$ can be consumed by circulating the induced currents $I_{ID}$ among the conductive layers 21, 22, and 23, and the current flowing outside the delta connection including the conductive layers 21, 22, and 23 can be reduced. Even when the induced current $I_{ID}$ flows into the controller 24 through the electric wires 251, 252, and 253 as unexpected noise 106 as shown in FIG. 2, the noise 106 is sufficiently smaller than the noise 106 in the comparative example (FIG. 4).

In accordance with the present embodiment, it is possible to prevent burnout of the electric wires 251, 252, and 253 outside the delta connection by the induced current flowing in a lightning strike, and damage to the controller 24 with the controller 24 exceeding the withstand voltage. It is thus possible to ensure sufficient reliability of the windshield 10 and the anti-icing/anti-fogging device 20 against lightning strikes.

Modification of First Embodiment

Figure 8A:
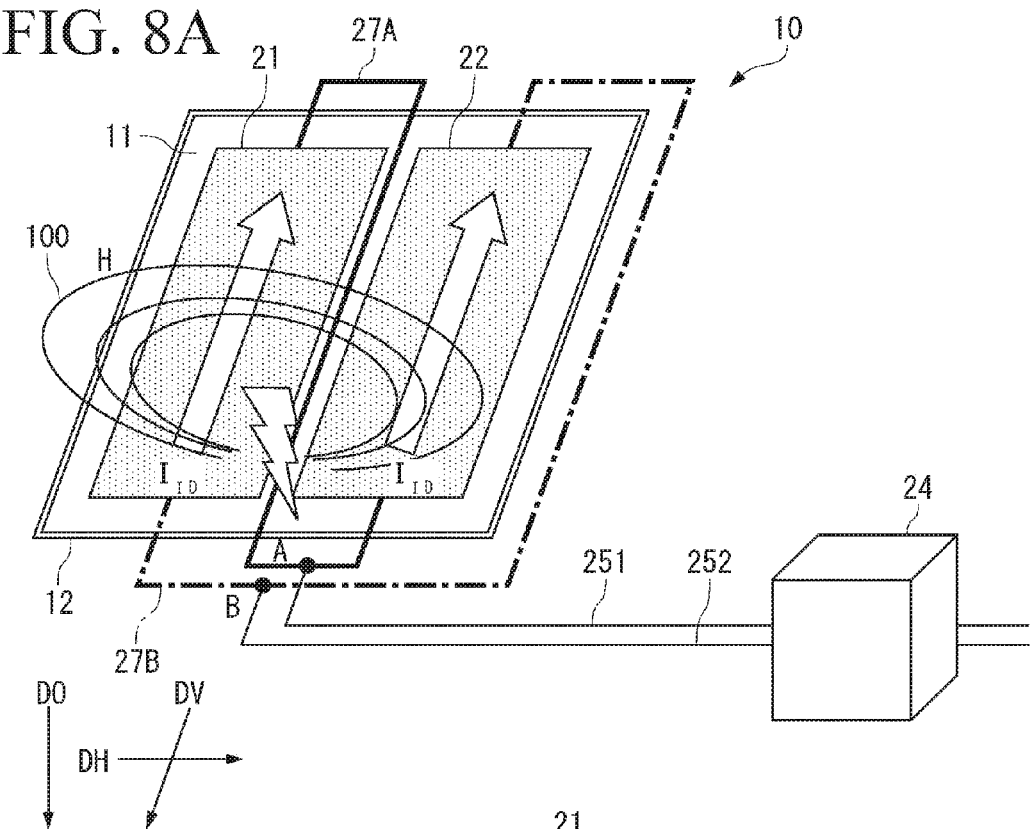
FIG. 8A is a schematic view illustrating a windshield and an anti-icing/anti-fogging device according to a modification of the first embodiment.

The windshield 10 according to a modification shown in FIG. 8A includes the two conductive layers 21 and 22 as the heater.

Each of the conductive layers 21 and 22 is designed as a circuit that allows a current to flow along the longitudinal direction DV. The conductive layers 21 and 22 are arranged at a predetermined interval in the lateral direction DH.

The conductive layers 21 and 22 are disposed in respective two regions obtained by equally dividing the plane region of the windshield 10.

The conductive layers 21 and 22 are wire-connected in a loop shape, and are supplied with a single-phase alternating current or a direct current by the controller 24.

The conductive layers 21 and 22 of the present modification are also wire-connected such that the induced currents $I_{ID}$ are circulated between the conductive layers 21 and 22 similarly to the first embodiment.

Figure 8B:
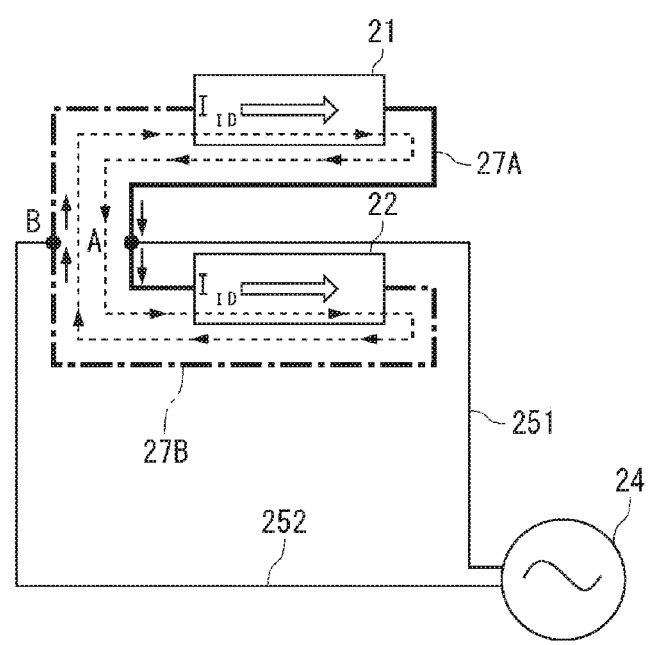
FIG. 8B is a wire connection diagram.

In FIG. 8A, and FIG. 8B that is a wire connection diagram of the conductive layers 21 and 22, a section 27A that links the upper end of the conductive layer 21 and the lower end of the conductive layer 22 is indicated by a solid line. A section 27B that links the upper end of the conductive layer 22 and the lower end of the conductive layer 21 is indicated by an alternate long and short dash line.

The induced currents $I_{ID}$ flow from the lower side to the upper side as indicated by outlined arrows in FIGS. 8A and 8B when the conductive layers 21 and 22 are placed in the magnetic field H (FIG. 6A) generated by the lightning strike.

As shown in FIG. 8B, the induced current $I_{ID}$ induced in the conductive layer 21 flows toward the A point positioned in the section 27A from the B point positioned in the section 27B.

On the other hand, the induced current $I_{ID}$ induced in the conductive layer 22 flows toward the B point from the A point.

That is, since the induced current flows into and out of each of the A point and the B point, an excess current does not flow on the controller 24-side with respect to the A and B points.

Therefore, in a state in which the flowing of the current to and from the outside of the looped path including the conductive layers 21 and 22 is suppressed, the induced currents $I_{ID}$ are circulated between the conductive layers 21 and 22 as indicated by dashed arrows in FIG. 8B, and are consumed as heat.

As a result, influences of the induced currents $I_{ID}$ on the sections of the electric wires 251 and 252 positioned outside the looped path, the controller 24, and an upstream side of the controller 24 can be reduced.

Second Embodiment

Next, a second embodiment of the present invention will be described by reference to FIGS. 9A, 9B.

In second and subsequent embodiments, different points from those of the first embodiment will be mainly described.

In the second embodiment, the induced currents $I_{ID}$ induced in the respective conductive layers 21, 22, and 23 are canceled out by each other.

Figure 9A:
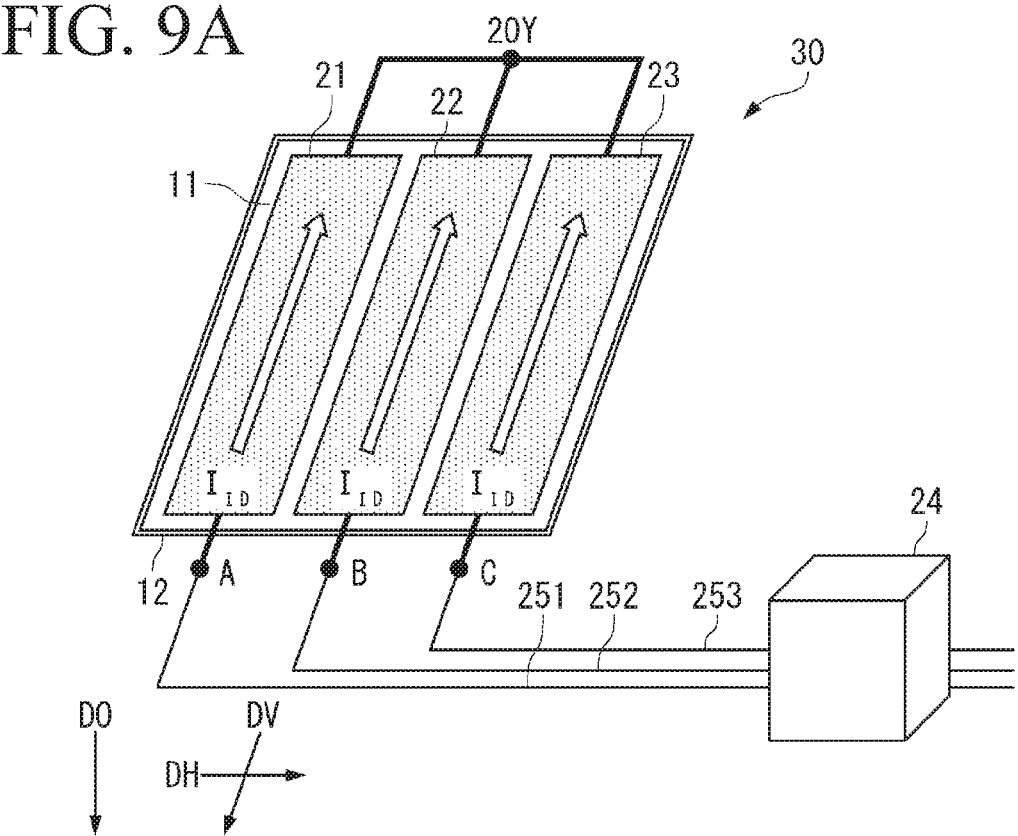
FIG. 9A is a schematic view illustrating a windshield and an anti-icing/anti-fogging device according to a second embodiment.
Figure 9B:
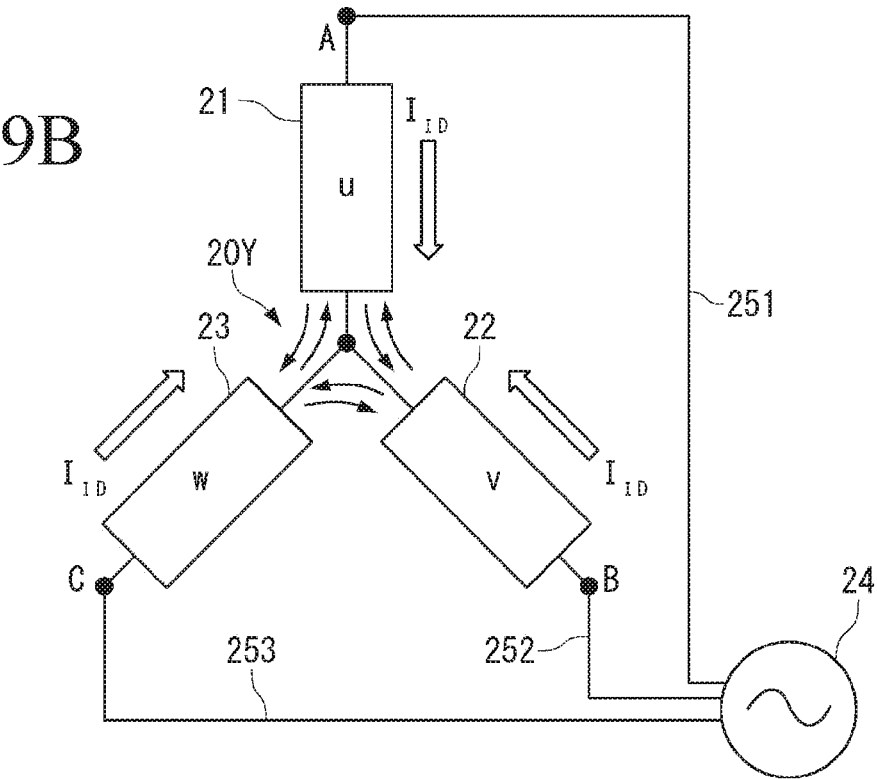
FIG. 9B is a wire connection diagram.

A windshield 30 of the second embodiment shown in FIG. 9A includes the conductive layers 21, 22, and 23 that extend along the longitudinal direction DV similarly to the first embodiment. The upper ends of the respective conductive layers 21, 22, and 23 are star-connected at a neutral point 20Y.

The induced currents $I_{ID}$ are induced in the conductive layers 21, 22, and 23 from the lower side to the upper side as indicated by outlined arrows in FIG. 9A when the conductive layers 21, 22, and 23 are placed in the magnetic field H generated by the lightning strike. As shown in FIG. 9A, and 9B that is a wire connection diagram, the induced currents $I_{ID}$ induced in the respective conductive layers 21, 22, and 23 are thereby canceled out by each other, and flowing of the induced currents $I_{ID}$ to the electric wires 251, 252, and 253 that are connected to the lower ends of the respective conductive layers 21, 22, and 23 is suppressed. Accordingly, the influences of the induced currents $I_{ID}$ on the electric wires 251, 252, and 253, the controller 24, or the like can be reduced.

Modification of Second Embodiment

Figure 10:
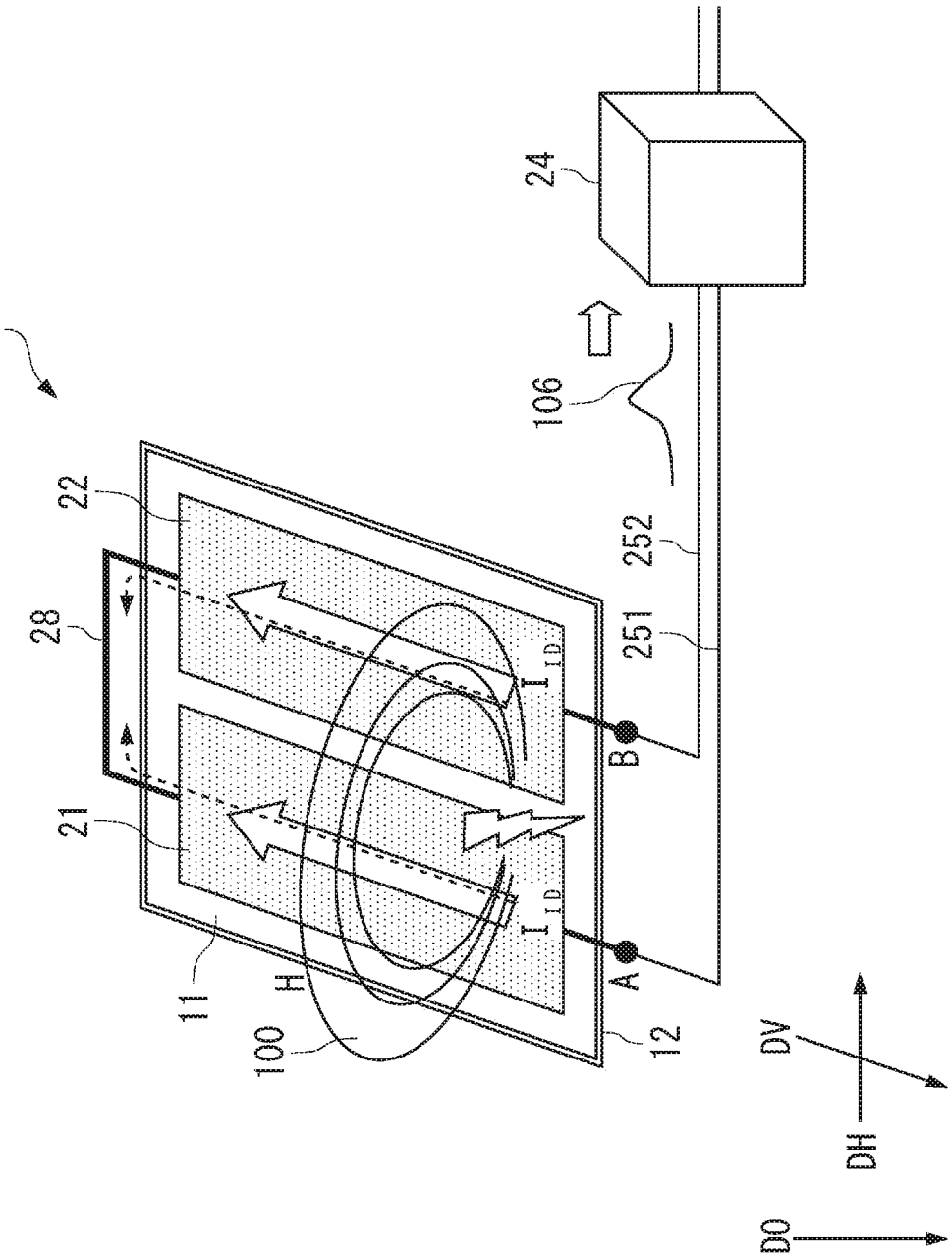
FIG. 10 is a schematic view illustrating a windshield and an anti-icing/anti-fogging device according to a modification of the second embodiment.

The windshield 30 according to a modification shown in FIG. 10 includes the two conductive layers 21 and 22 as the heater.

The conductive layers 21 and 22 are disposed in respective two regions obtained by equally dividing the plane region of the windshield 30.

The conductive layers 21 and 22 are wire-connected at the upper ends, and are supplied with a single-phase alternating current or a direct current.

The induced currents $I_{ID}$ are induced in the conductive layers 21 and 22 extending along the longitudinal direction DV from the lower side to the upper side as indicated by outlined arrows in FIG. 10 when the conductive layers 21 and 22 are placed in the magnetic field H generated by the lightning strike. The induced current $I_{ID}$ flowing through the conductive layer 21, and the induced current $I_{ID}$ flowing through the conductive layer 22 are thereby canceled out by each other (see dashed arrows). Accordingly, the influences of the induced currents $I_{ID}$ on the electric wires 251 and 252 connected to the lower ends of the conductive layers 21 and 22, the controller 24, or the like can be reduced.

Third Embodiment

Next, a third embodiment of the present invention will be described by reference to FIG. 11.

In the third embodiment, a ratio of areas of a plurality of conductive layers is set based on a distribution of a magnetic field intensity in order to sufficiently cancel out the induced currents $I_{ID}$ induced in the respective conductive layers of the windshield 30 among the conductive layers.

Figure 11:
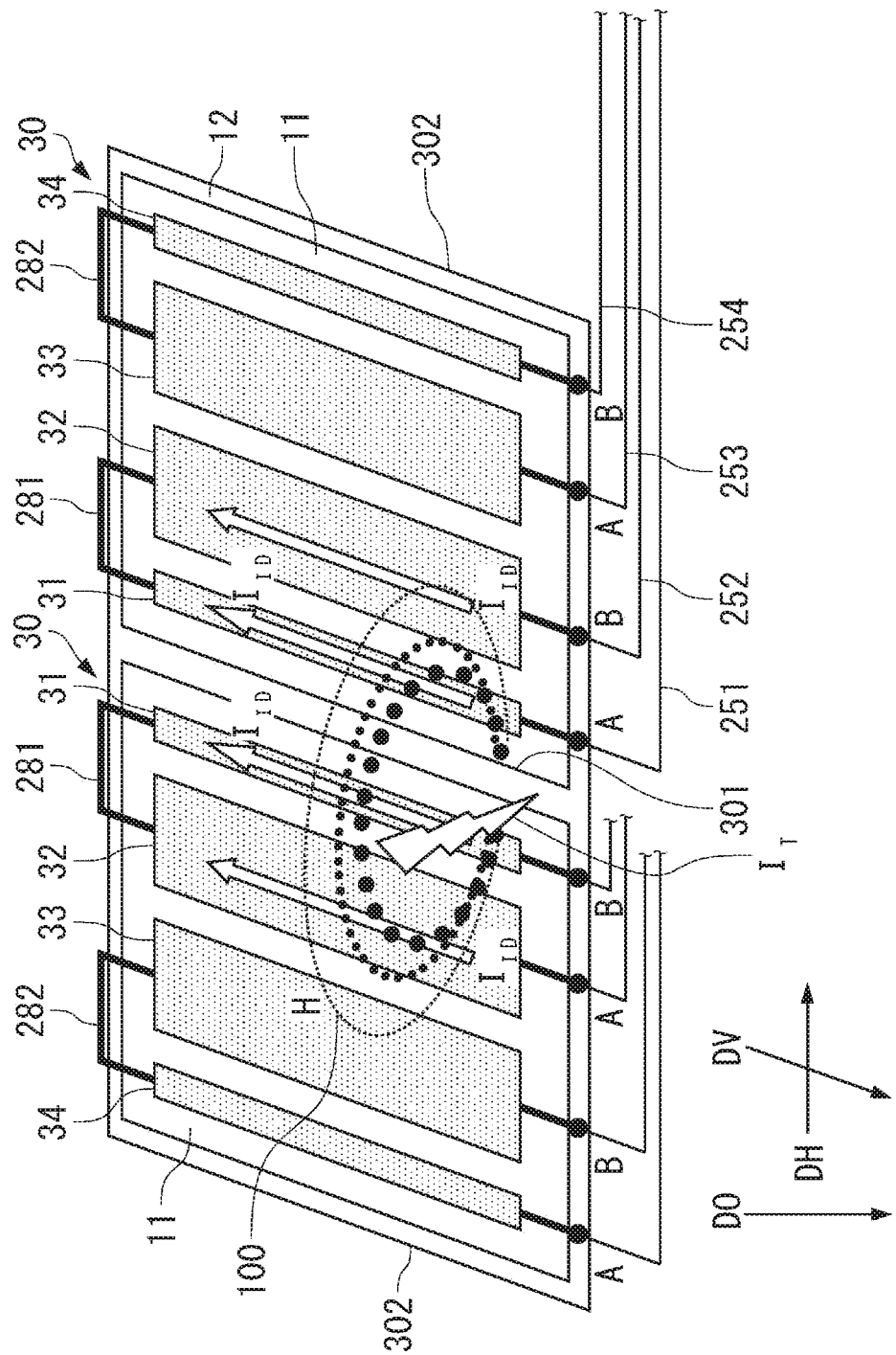
FIG. 11 is a schematic view illustrating a windshield and an anti-icing/anti-fogging device according to a third embodiment.

FIG. 11 shows the two main windshields 30 and 30 adjacent to each other. Peripheral edge portions of the windshields 30 are supported on the airframe by the metal retainer 12. The metal wiper (not shown) is also provided between the windshields 30 and 30.

Each of the windshields 30 includes four conductive layers 31, 32, 33, and 34 as the heater. All of the conductive layers 31 to 34 extend along the longitudinal direction DV, and are arranged in the lateral direction DH.

The conductive layers 31 to 34 are disposed symmetrically with respect to the center of a lateral width of the windshield 30.

The conductive layers 31 and 32 are disposed in a region on one end side in a lateral width direction of the windshield 30.

In an example in FIG. 11, the conductive layers 31 and 32 are disposed in each of a right region of the windshield 30 shown on a left side, and a left region of the windshield 30 shown on a right side.

Surface resistivity of the conductive layer 31 and surface resistivity of the conductive layer 32 are equal to each other.

On the other hand, the conductive layers 33 and 34 are disposed in a region on the other end side in the lateral width direction of the windshield 30.

In the example in FIG. 11, the conductive layers 33 and 34 are disposed in each of a left region of the windshield 30 shown on the left side, and a right region of the windshield 30 shown on the right side.

Surface resistivity of the conductive layer 33 and surface resistivity of the conductive layer 34 are equal to each other.

The upper ends of the respective conductive layers 31 and 32 are wire-connected by a wire 281, and the lower ends of the respective conductive layers 31 and 32 are connected to a controller (not shown) via the electric wires 251 and 252. The conductive layers 31 and 32 are supplied with a single-phase alternating current or a direct current by a controller (not shown).

The conductive layers 33 and 34 are wire-connected by a wire 282 at the upper ends, and are supplied with a single-phase alternating current or a direct current by the controller (not shown) connected to the lower ends via the electric wires 253 and 254.

Lightning is likely to reach (strike) the retainer 12 or the wiper made of metal. Particularly, lightning is likely to strike the vicinity of a peripheral edge portion 301 in the longitudinal direction DV of the windshield 30 where a longitudinal side of the retainer 12 and the wiper are positioned.

In a case in which the lightning current $I_T$ is generated in the peripheral edge portion 301 of the windshield 30 by a lightning strike, the magnetic field H indicated by the wavefront 100 is generated around the lightning current $I_T$ as shown in FIG. 11. An intensity of the magnetic field H (a field intensity) is distributed so as to become higher as a distance to the center of the wavefront 100 decreases, and become lower as a distance from the center increases.

When lightning strikes the vicinity of the peripheral edge portion 301 in the longitudinal direction DV of the windshield 30 to which the conductive layer 31 is adjacent, a magnetic field having a higher intensity is applied to the conductive layer 31 than to the conductive layer 32 since the conductive layer 31 is closer to the peripheral edge portion 301.

Based on the above fact, in the present embodiment, a width of the conductive layer 31 is made smaller than a width of the conductive layer 32. Accordingly, electrical resistance of the conductive layer 31 is relatively large, and electrical resistance of the conductive layer 32 is relatively small based on a difference between sectional areas of the conductive layers 31 and 32. Thus, the induced currents $I_{ID}$ flowing through the respective conductive layers 31 and 32 can be balanced. The induced currents $I_{ID}$ can be thereby sufficiently canceled out.

Also, in order to deal with a case in which lightning strikes the vicinity of a peripheral edge portion 302 in the longitudinal direction DV of the windshield 30 to which the conductive layer 34 is adjacent, a width of the conductive layer 34 to which a larger magnetic field is applied than to the conductive layer 33 since the conductive layer 34 is closer to the peripheral edge portion 302 is made smaller than a width of the conductive layer 33. Accordingly, the induced current $I_{ID}$ flowing through the conductive layer 33 and the induced current $I_{ID}$ flowing through the conductive layer 34 can be also balanced. The induced currents can be thereby sufficiently canceled out.

Modification of Third Embodiment

The third embodiment can be also applied to a heater to which a three-phase alternating current is supplied.

Figure 12:
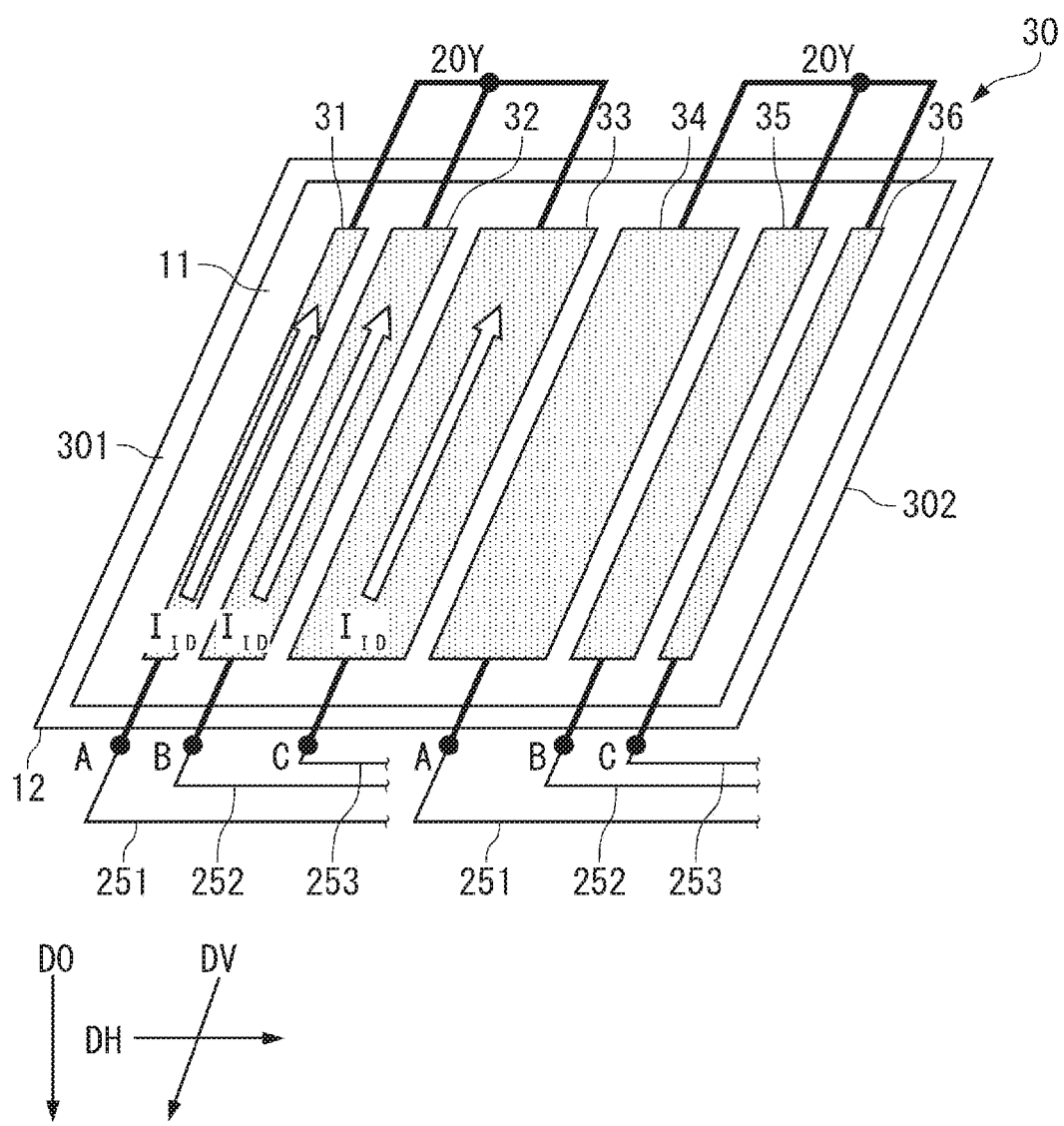
FIG. 12 is a schematic view illustrating a windshield and an anti-icing/anti-fogging device according to a modification of the third embodiment.

The windshield 30 shown in FIG. 12 includes six conductive layers 31 to 36 as the heater. All of the conductive layers 31 to 36 extend along the longitudinal direction DV.

The conductive layers 31 to 33 are disposed in a left region of the windshield 30, and the conductive layers 34 to 36 are disposed in a right region of the windshield 30. The conductive layers 31 to 36 are disposed symmetrically with respect to the center of the lateral width of the windshield 30.

The upper ends of the respective conductive layers 31 to 33 are star-connected. The conductive layers 31 to 33 are supplied with a three-phase alternating current by the controller (not shown) through the electric wires 251 to 253 connected to the lower ends of the respective conductive layers 31 to 33.

The conductive layers 33 to 36 are similarly star-connected, and supplied with a three-phase alternating current.

The conductive layers 31 to 33 and the conductive layers 34 to 36 are given a smaller width as the conductive layer is closer to the peripheral edge portion 301 or the peripheral edge portion 302 in the longitudinal direction DV of the windshield 30 that is likely to be struck by lightning based on the above distribution of the field intensity.

For example, when lightning strikes the vicinity of the peripheral edge portion 301, a largest magnetic field is applied to the conductive layer 31 out of the conductive layers 31 to 33, and the field intensity applied to the conductive layers 31 to 33 is decreased in order of the conductive layer 31, the conductive layer 32, and the conductive layer 33. The conductive layers 31 to 33 are set to have a larger width as the conductive layer is farther from the peripheral edge portion 301 so as to be inversely proportional to the field intensity.

Similarly, when lightning strikes the vicinity of the peripheral edge portion 302, a largest magnetic field is applied to the conductive layer 36 out of the conductive layers 34 to 36, and the field intensity is decreased in order of the conductive layer 36, the conductive layer 35, and the conductive layer 34. The conductive layers 36 to 34 are set to have a larger width as the conductive layer is farther from the peripheral edge portion 302.

By employing the above configuration, the induced currents $I_{ID}$ can be balanced and sufficiently canceled out among the conductive layers 31 to 33, and the induced currents $I_{ID}$ can be balanced and sufficiently canceled out among the conductive layers 34 to 36.

Fourth Embodiment

Next, a fourth embodiment of the present invention will be described by reference to FIG. 13.

A windshield 40 according to the fourth embodiment includes two conductive layers 41 and 42 as different layers of the laminate.

Both of the conductive layers 41 and 42 are disposed over substantially the entire plane region of the windshield 40. The conductive layers 41 and 42 are wire-connected at the upper ends by a wire 28, and are supplied with a single-phase alternating current or a direct current by the controller 24 that is connected via the electric wires 251 and 252 connected to the lower ends of the respective conductive layers.

Since the conductive layers 41 and 42 are disposed in the same region in the in-plane direction of the windshield 40, the distributions of the field intensity applied to the respective conductive layers 41 and 42 by the magnetic field H are almost equal to each other, or even if there is a difference between the distributions of the field intensity, the difference is small. Therefore, the induced current $I_{ID}$ induced in the conductive layer 41 and the induced current $I_{ID}$ induced in the conductive layer 42 (indicated by an alternate long and short dash line) can be balanced and sufficiently canceled out.

In accordance with the present embodiment, it is not necessary to consider the width of each of the conductive layers as in the third embodiment.

Modification of Fourth Embodiment

Although not shown in the drawings, the windshield 40 may include three conductive layers to which a three-phase alternating current is supplied as different layers of the laminate. The upper ends of the respective conductive layers are wire-connected at the neutral point 20Y.

The induced currents $I_{ID}$ flowing through the respective three conductive layers can be balanced and sufficiently canceled out.

Figure 13:
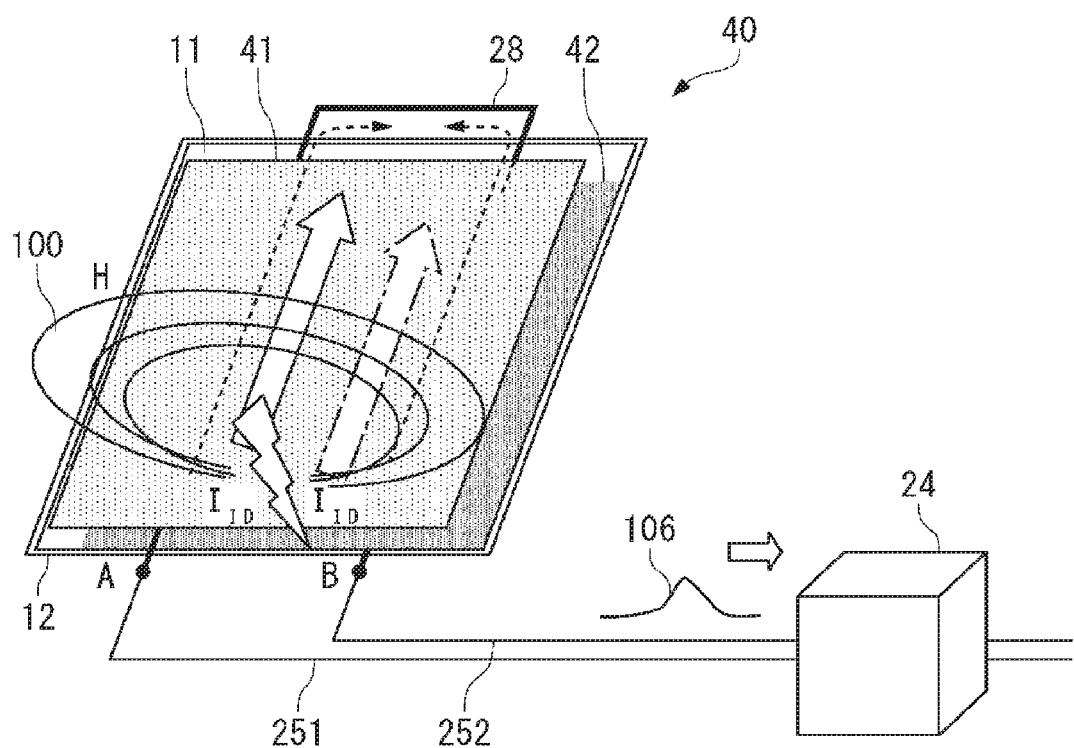
FIG. 13 is a schematic view illustrating a windshield and an anti-icing/anti-fogging device according to a fourth embodiment.

The configuration in which the plurality of conductive layers are disposed at different positions in the thickness direction of the windshield 40 as shown in FIG. 13 can be applied to a configuration in which the induced current $I_{ID}$ is circulated as in the first embodiment.

That is, as for the three conductive layers disposed at different positions in the thickness direction of the windshield 40, the induced currents $I_{ID}$ induced in the respective three conductive layers can be canceled out by wire-connecting the upper end of one of the adjacent layers in the delta connection and the lower end of the other of the adjacent layers similarly to the conductive layers 21 to 23 of the first embodiment.

Fifth Embodiment

Figure 14:
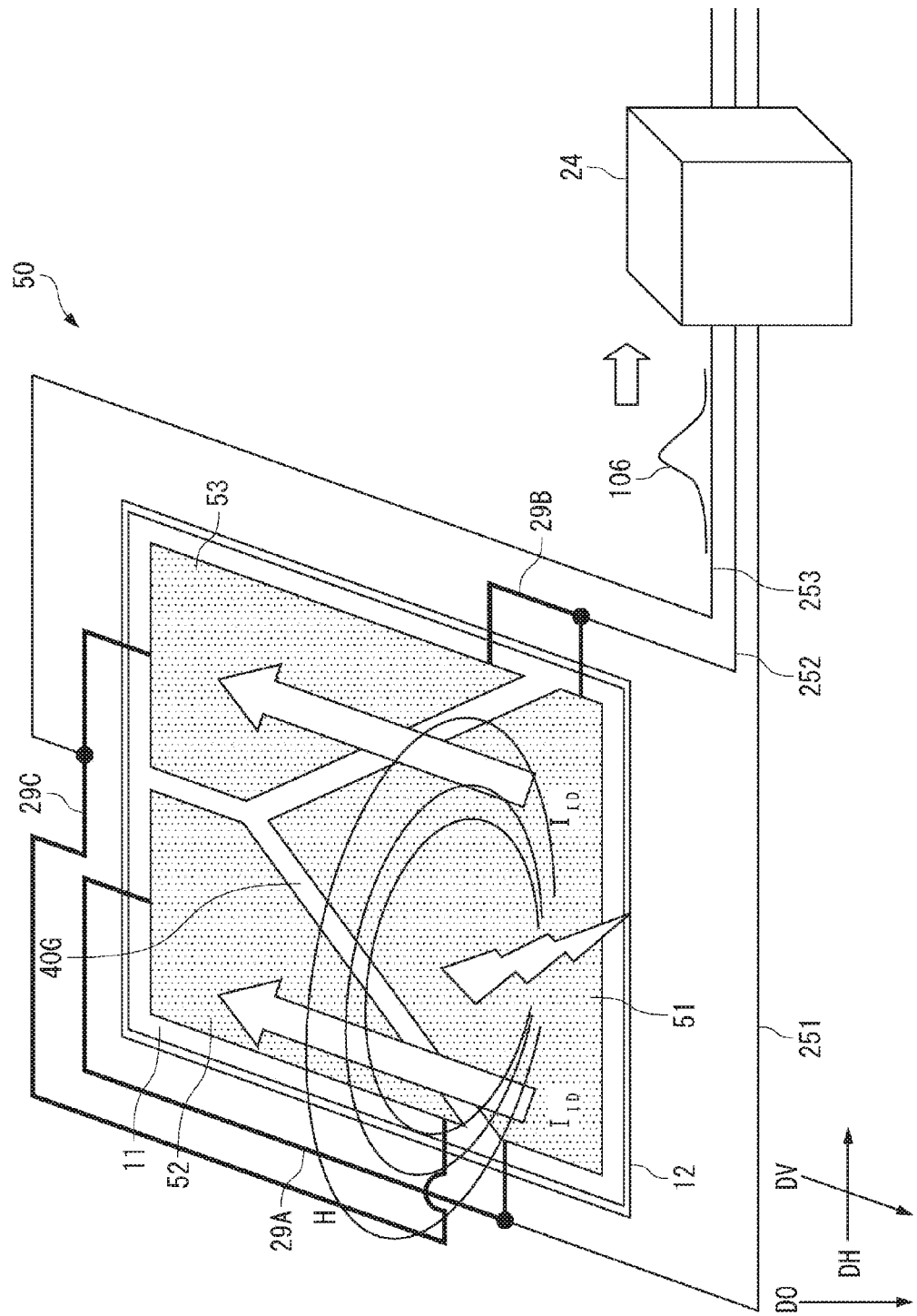
FIG. 14 is a schematic view illustrating a windshield and an anti-icing/anti-fogging device according to a fifth embodiment.

A windshield 50 according to a fifth embodiment shown in FIG. 14 includes three conductive layers 51, 52, and 53 as the heater.

The conductive layers 51, 52, and 53 are delta-connected, and are supplied with a three-phase alternating current.

The conductive layers 51, 52, and 53 are disposed in respective three regions obtained by dividing the plane region of the windshield 50 by an inverted Y-shaped gap 40G. The conductive layers 51, 52, and 53 are formed symmetrically with respect to the center of the lateral width of the windshield 50.

"Left" and "right" in the present embodiment accord with the left and the right in FIG. 14.

The conductive layer 51 is formed in a substantially triangular shape, and is disposed on a lower side of the windshield 50.

The conductive layer 52 is disposed above the conductive layer 51, and on the left side.

The conductive layer 53 is disposed above the conductive layer 51, and on the right side.

The conductive layers 51 and 52 are wire-connected by a wire 29A that extends along the longitudinal direction DV. The wire 29A is connected to a left end portion in the conductive layer 51.

The conductive layers 51 and 53 are wire-connected by a wire 29B that extends along the longitudinal direction DV. The wire 29B is connected to a right end portion in the conductive layer 51.

The conductive layers 52 and 53 are wire-connected by a wire 29C that extends along the lateral direction DH. The wire 29C is connected to the upper ends of the respective conductive layers 52 and 53.

The two induced currents $I_{ID}$ are induced as indicated by outlined arrows in FIG. 14 by the magnetic field H generated by the lightning strike.

The induced current $I_{ID}$ induced on the left side and the induced current $I_{ID}$ induced on the right side have the same potential, and are thus canceled out.

Therefore, the influences of the induced currents $I_{ID}$ on the electric wires 251 and 252 connected to the left side and the right side at the lower end of the conductive layer 51, the electric wire 253 connected to the wire 29C, the controller 24, or the like can be reduced.

The constitutions described in the aforementioned embodiments may be also freely selected or appropriately changed into other constitutions without departing from the gist of the present invention.

Although the conductive layers provided in the windshield in the above respective embodiments extend along the longitudinal direction DV, the conductive layers may extend along a direction inclined with respect to the longitudinal direction DV. Even in this case, since the component in the vertical direction D0 that can be considered as the direction of the lightning current generated by a lightning strike to the aircraft is included in the direction in which the conductive layers extend, the induced currents flow through the conductive layers by electromagnetic induction. Accordingly, the influences on an upstream side of the conductive layers (a side that supplies an alternating current to the conductive layers) can be reduced by circulating or canceling out the induced currents as described in the above respective embodiments.

Also, in the above respective embodiments, electrically-heated wires may be employed instead of the conductive layers.

Figure 15:
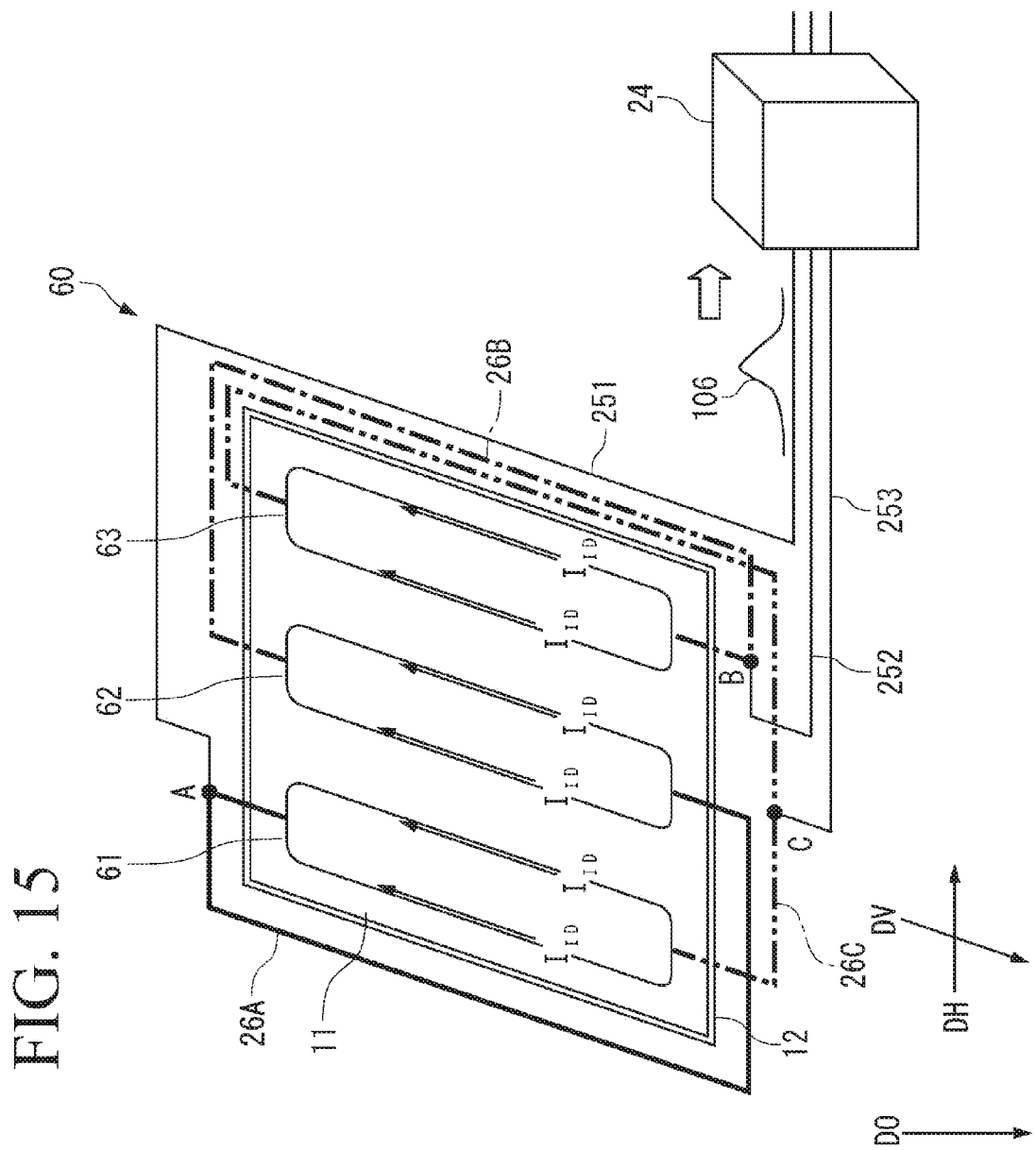
FIG. 15 is a schematic view illustrating a windshield and an anti-icing/anti-fogging device according to a modification of the present invention.

FIG. 15 shows an example of a windshield that employs the electrically-heated wires.

A windshield 60 includes electrically-heated wires 61, 62, and 63 that are wired in the in-plane direction of the windshield 60 as the heater.

The electrically-heated wires 61, 62, and 63 are provided in the windshield 60 by being embedded in the windshield panel 11, or being sandwiched between the windshield panels 11.

The electrically-heated wires 61, 62, and 63 correspond to a three-phase alternating current applied by the controller 24. The electrically-heated wires 61, 62, and 63 are delta-connected such that the induced currents $I_{ID}$ are circulated similarly to the conductive layers 21, 22, and 23 of the first embodiment.

All of the electrically-heated wires 61, 62, and 63 are wired in a loop shape extending along the longitudinal direction DV, and are arranged in the lateral direction DH of the windshield 60.

Since the induced currents $I_{ID}$ flowing by a lightning strike are consumed as heat while being circulated among the electrically-heated wires 61, 62, and 63, the influences of the induced currents $I_{ID}$ on the outside of the wire connection of the electrically-heated wires 61, 62, and 63 can be reduced.

What is claimed is:

1. A windshield of an aircraft, comprising
a plurality of conductive members that are disposed along an in-plane direction of the windshield, and are wire-connected together,
wherein the plurality of conductive members are heaters that generate heat when supplied with an alternating current, and
the conductive members are wire-connected such that induced currents induced in the respective conductive members by a magnetic field in association with a lightning current are circulated between the conductive members.

2. The windshield of an aircraft according to claim 1,
wherein the number of the conductive members is three, which are configured to be delta-connected and supplied with a three-phase alternating current,
all of the three conductive members extend in a direction crossing a horizontal direction in the in-plane direction of the windshield, and
the windshield comprises a path in which the induced currents are circulated among the conductive members, the path is configured by wire-connecting an upper end portion of one of the adjacent conductive members in the delta connection formed by the three conductive members, and a lower end portion of the other of the adjacent conductive members.

3. The windshield of an aircraft according to claim 1,
wherein the number of the conductive members is two, which are configured to be supplied with a single-phase alternating current or a direct current,
all of the two conductive members extend in a direction crossing a horizontal direction in the in-plane direction of the windshield, and
the windshield comprises a path in which the induced currents are circulated between the conductive members, the path is configured by wire-connecting an upper end portion of one of the conductive members, and a lower end portion of the other of the conductive members.

4. The windshield of an aircraft according to claim 1,
wherein the plurality of conductive members are disposed at different positions from each other in a thickness direction of the windshield.

5. The windshield of an aircraft according to claim 1,
wherein each of the plurality of conductive members is a line-like member wired in the in-plane direction.

6. The windshield of an aircraft according to claim 1,
wherein each of the plurality of conductive members is a planar conductive layer along the in-plane direction.

7. The windshield of an aircraft according to claim 6,
wherein a peripheral edge portion of the windshield is supported on an airframe via a supporting member having conductivity, and
a conductive layer positioned relatively close to the supporting member in a lateral direction included in the in-plane direction of the windshield out of the plurality of conductive layers has a smaller width than that of the other conductive layers.

8. An aircraft comprising the windshield according to claim 1.

* * * * *

UNITED STATES PATENT AND TRADEMARK OFFICE
CERTIFICATE OF CORRECTION

PATENT NO. : 9,957,034 B2
APPLICATION NO. : 14/977941
DATED : May 1, 2018
INVENTOR(S) : Yamaura et al.

Page 1 of 1

It is certified that error appears in the above-identified patent and that said Letters Patent is hereby corrected as shown below:

In the Specification

Column 9, Line 32, "$I_D$" should be -- $I_{ID}$ --.

Signed and Sealed this
Tenth Day of July, 2018

Andrei Iancu
*Director of the United States Patent and Trademark Office*